(12) United States Patent
Sarkar et al.

(10) Patent No.: US 6,806,991 B1
(45) Date of Patent: Oct. 19, 2004

(54) FULLY RELEASED MEMS XYZ FLEXURE STAGE WITH INTEGRATED CAPACITIVE FEEDBACK

(75) Inventors: Neil Sarkar, Brossard (CA); Aaron Geisberger, Plano, TX (US); Matthew D. Ellis, Allen, TX (US)

(73) Assignee: Zyvex Corporation, Richardson, TX (US)

( * ) Notice: Subject to any disclaimer, the term of this patent is extended or adjusted under 35 U.S.C. 154(b) by 218 days.

(21) Appl. No.: 10/219,044

(22) Filed: Aug. 14, 2002

Related U.S. Application Data

(60) Provisional application No. 60/312,706, filed on Aug. 16, 2001.

(51) Int. Cl.[7] .............................................. G02B 26/00
(52) U.S. Cl. ...................................... 359/290; 354/224
(58) Field of Search ............................... 359/290, 291, 359/237, 872, 298, 224

(56) References Cited

U.S. PATENT DOCUMENTS

| | | | |
|---|---|---|---|
| 5,909,078 A | 6/1999 | Wood et al. | |
| 5,963,367 A | 10/1999 | Aksyuk et al. | |
| 6,467,761 B1 * | 10/2002 | Amatucci et al. | ............. 269/58 |
| 6,672,795 B1 * | 1/2004 | Ellis et al. | ................. 403/327 |
| 6,679,055 B1 * | 1/2004 | Ellis | ............................. 60/527 |
| 2002/0114058 A1 * | 8/2002 | DeReus et al. | ............. 359/298 |

OTHER PUBLICATIONS

U.S. patent application Ser. No. 60/312,706, Sarkar et al., pending.

Harness, Ty, et al, "Characteristic modes of electrostatic comb–drive X–Y microactuators," J. Micromech. Microeng. 9 (1999) pp. 1–8.

* cited by examiner

*Primary Examiner*—Scott J. Sugarman
*Assistant Examiner*—Richard Hanig
(74) *Attorney, Agent, or Firm*—Haynes and Boone, LLP

(57) ABSTRACT

In one embodiment, the present invention is directed to a system that enables controllable positioning of a fully-released micro-stage. The fully-released micro-stage may be assembled onto a detector substrate that enables micro-positioning feedback. A payload structure (e.g., a lens, mirror, manipulator, and/or the like) may be assembled or coupled onto the fully-release microstage. Snap connectors may facilitate the mechanical coupling associated with assembly of the various components. The fully-released microstage may be actuated by motion amplified actuators that are coupled to anchored flexures. Moreover, the actuation of the fully-release microstage may produce fully decoupled movement by coupling the actuators and respective flexures to the stage in a mirrored fashion.

25 Claims, 9 Drawing Sheets

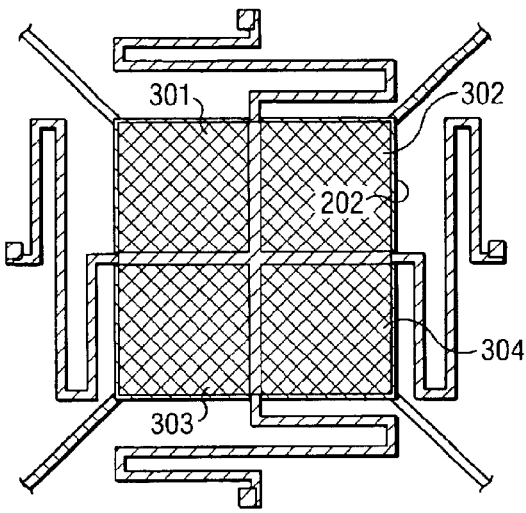
FIG. 3
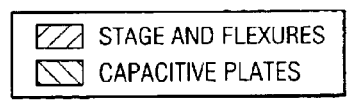
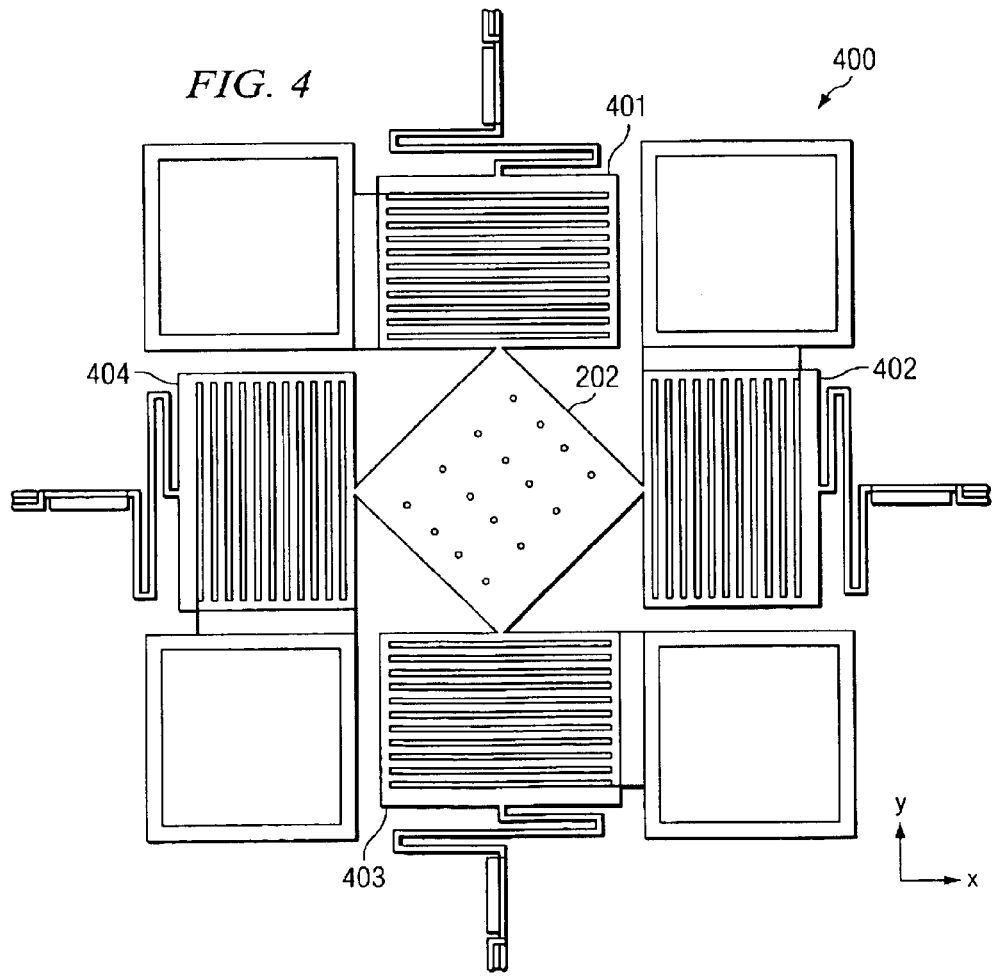
FIG. 4

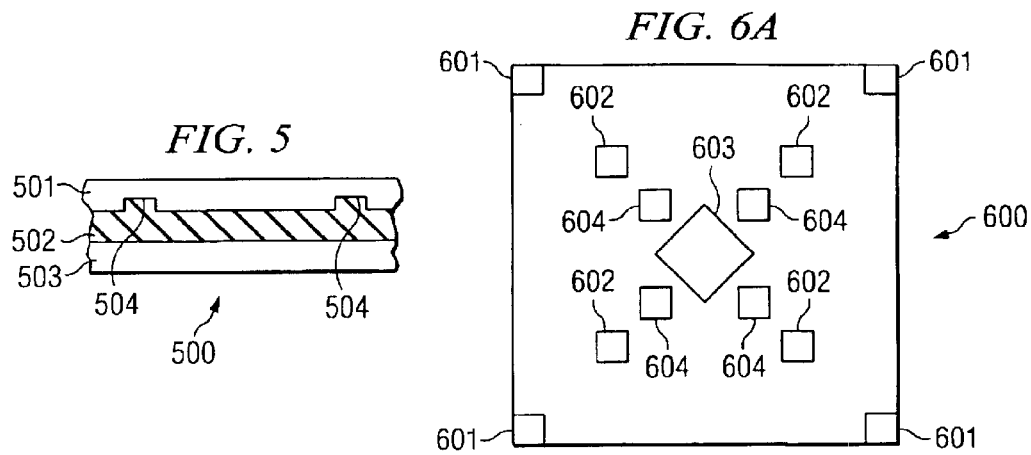
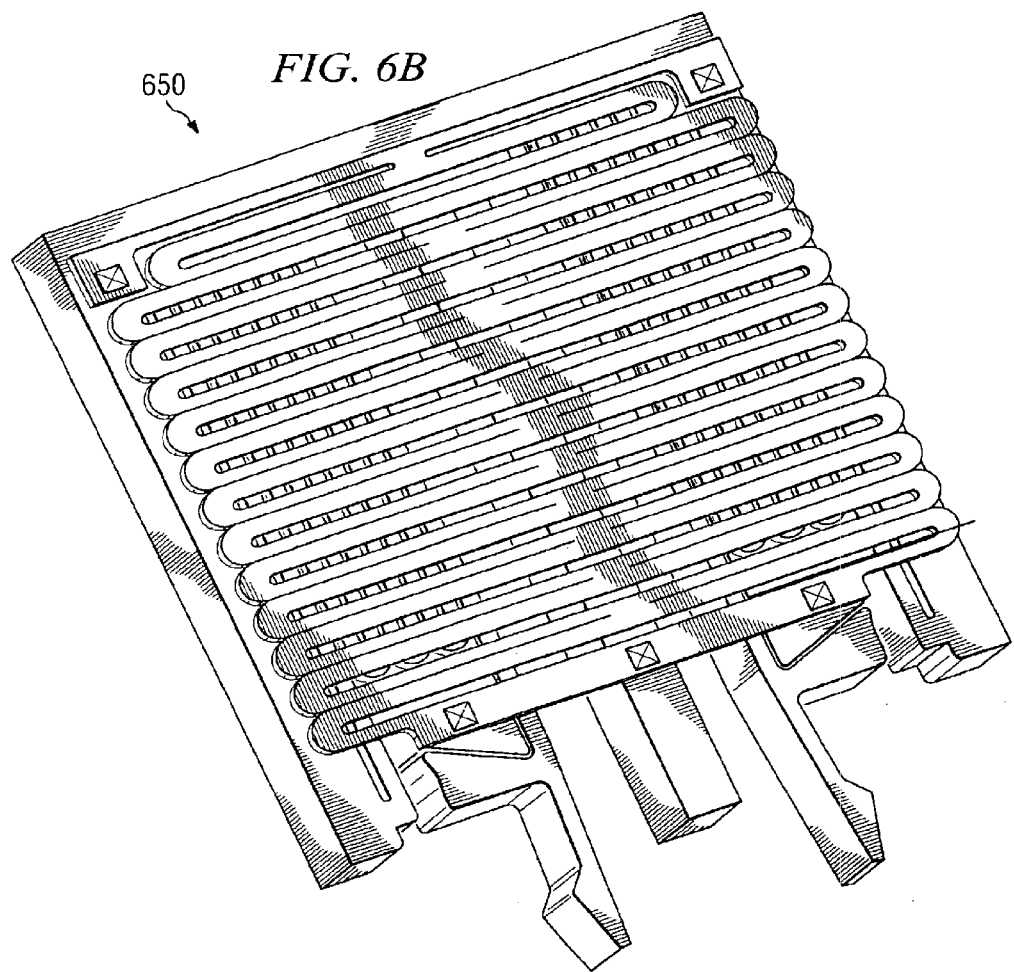

FULLY RELEASED MEMS XYZ FLEXURE STAGE WITH INTEGRATED CAPACITIVE FEEDBACK

RELATED APPLICATIONS

The present invention claims the benefit of co-pending U.S. Provisional Application Ser. No. 60/312,706 filed Aug. 16, 2001, entitled "MICROCOMPONENTS AND APPLICATIONS THEREOF," which is incorporated herein by reference.

TECHNICAL FIELD

The present invention is in general related to manipulation of a stage and, more particularly, to manipulation of a fully released stage in a decoupled manner according to closed-loop feedback with sub-micron accuracy.

BACKGROUND OF THE INVENTION

Scanning probe microscopes (SPMs) are devices which manipulate a scanning probe with sub-atomic accuracy to scan the surface of a sample object or material. For example, the scanning tunneling microscope (STM) is a solid-state microscope based on the principle of quantum mechanical tunneling of electrons between a sharp tip and a conducting sample. The tip of an STM is an extremely sharp metal tip. The tip is mounted on a system of piezoelectric drives which are controllable with sub-atomic precision. The scanning process begins by bringing the tip within a few Angstroms of the conducting sample surface. At such separations, the outer electron orbitals of the tip and the sample overlap. Accordingly, on the application of a bias voltage between the tip and the surface, electrons tunnel through the vacuum barrier via the quantum mechanical tunneling effect, even though the tip and the surface are not in physical contact. By scanning the tip across the sample surface, it is possible to image directly the three-dimensional real space structure of a surface at atomic resolutions.

To provide the necessary scanning resolution, scanning operations of an SPM are typically implemented utilizing a piezo element. FIG. 1A depicts a block diagram of a typical SPM 100 according to the prior art. The sample 103 to be scanned is placed on stage 102. Control means 105 causes a suitable voltage to be applied to piezo element 104. In response to the applied voltage, piezo element 104 controllably expands. Utilizing suitably designed piezo element 104, the expansion may occur in any of the X-direction, Y-direction, and Z-direction. In typical operations, control means 105 controls the vertical distance (in the Z-direction) between scanning tip 101 and sample 103. Also, control means 105 causes piezo element 104 to move scanning tip 101 over sample 103 according to, for example, a raster pattern in the X and Y-directions. The control of piezo element 104 may utilize various feedback techniques such as examining the tunneling current associated with scanning tip 101. Also, other feedback techniques may be utilized such as optical feedback, capacitive feedback, and piezo-resistive feedback (not shown). The imaging signal associated with scanning tip 101 may be provided to imaging system 106 for suitable processing. When piezo element 104 is utilized, the dimensions of SPM 100 are typically on the order of ten centimeters. Accordingly, the scanable area of an object placed on stage 102 is quite small relative to the size of SPM 100.

Moreover, XY stages that are controllable on precise resolutions are used for a variety of applications. For example, XY stages may be utilized to control a micro-lens for optical applications. FIG. 1B depicts XY stage 150 according to the prior art which is operable to control lens 155. XY stage 150 comprises a plurality of cascaded thermal actuators (151–154). The thermal actuators (151–154) are mechanically coupled to lens 155 via respective general purpose flexures which are generally known for use to facilitate actuation in Micro-Electrical-Mechanical (MEMs) devices. Actuators 152 and 154 enable displacement of lens 155 in the Y-direction and actuators 151 and 153 enable displacement of lens 155 in the X-direction. However, the design of XY stage 150 does not fully decouple the manipulation of lens 155 in the X and Y directions. Specifically, displacement of lens 155 in the X-direction by actuators 151 and 153 will also cause some amount of displacement in the Y-direction. Likewise, displacement of lens 155 in the Y-direction by actuators 152 and 154 will also cause some amount of displacement in the X-direction.

Thus, known structures that manipulate high resolution XYZ stages either (1) are associated with coupled movement where actuation in one direction causes a lesser degree of actuation in another direction; (2) require bulky piezo elements to achieve the desired non-coupled movement; or (3) are permanently anchored to the substrate on which they were fabricated.

Additionally, it is appropriate to note that various techniques exist for post-fabrication assembly of MEMs devices. For example, "flip-chip" bonding is well-known in the art for bonding two discrete structures after fabrication of the structures. However, flip-chip bonding is problematic, because it imposes a relatively simple mechanical design via the bonding of a first flat surface to a second flat surface. Thus, flip-chip bonding prevents assembly of structures with surface features and, hence, reduces the potential complexity of devices assembled utilizing this technique.

BRIEF SUMMARY OF THE INVENTION

The present invention is directed to a system and method which are operable to manipulate a fully released stage to provide decoupled movement that is controlled by suitable closed-loop feedback. In embodiments of the present invention, the XY positioning of the stage may be advantageously manipulated using a first plurality of actuators (e.g., comb drives, parallel plate actuators, shaped memory alloy (SMA) actuators, electrothermal actuators, piezo stack actuators, and/or the like) and a second plurality of actuators. In embodiments of the present invention, the actuators are implemented as flexure amplified banks of bent beams that each occupy approximately 400 microns in length. By utilizing actuators of this scale, the total size of the device may be significantly reduced. In embodiments of the present invention, the entire device may be approximately one millimeter in length.

Moreover, the actuators may be advantageously coupled to flexures which are, in turn, coupled to the stage. The actuators and the flexures are positioned and operate in a mirrored manner. Specifically, when it is desired to actuate the stage in the X-direction, two corresponding mirrored actuators are supplied current. The actuators move the stage in the desired direction via the coupled flexures. It shall be appreciated that the same actuators that cause the actuation in the X-direction may also produce undesired forces in the Y-direction. If the undesired forces are not addressed by embodiments of the present invention, the forces will produce coupled movement. However, embodiments of the present invention utilize the mirrored positioning and flexures to balance the undesired forces in the Y-direction. Thus, the total torque on the stage is approximately zero. Actuation in the Y-direction may also utilize a mirror positioning and operation of movements to decouple movement in the Y-direction. Thus, actuation in the X-direction and the Y-direction are fully decoupled. A third actuator may also be utilized to actuate the stage in the Z-direction. Also, suitable feedback structures (capacitive, optical, piezo-resistive, and/or the like) may be utilized to control the manipulation of the stage.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 depicts a base structure that provides quadrant capacitive feedback according to embodiments of the present invention;

FIG. 4 depicts an XYZ stage system that provides inter-digitated differential feedback according to embodiments of the present invention;

FIG. 5 depicts a fabrication stage where an XY stage is fabricated on top of a silicon oxide sacrificial layer according to embodiments of the present invention;

FIG. 6A depicts a base structure that is suitable to be mechanically coupled to an XY stage according to embodiments of the present invention;

FIG. 6B depicts a snap connector according to embodiments of the present invention;

DETAILED DESCRIPTION OF THE INVENTION

Figure 1A:
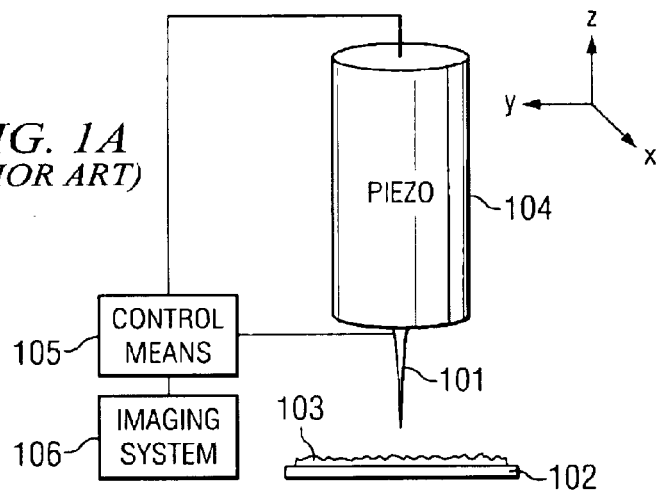
FIG. 1A depicts a scanning tunneling microscope according to the prior art.
Figure 2:
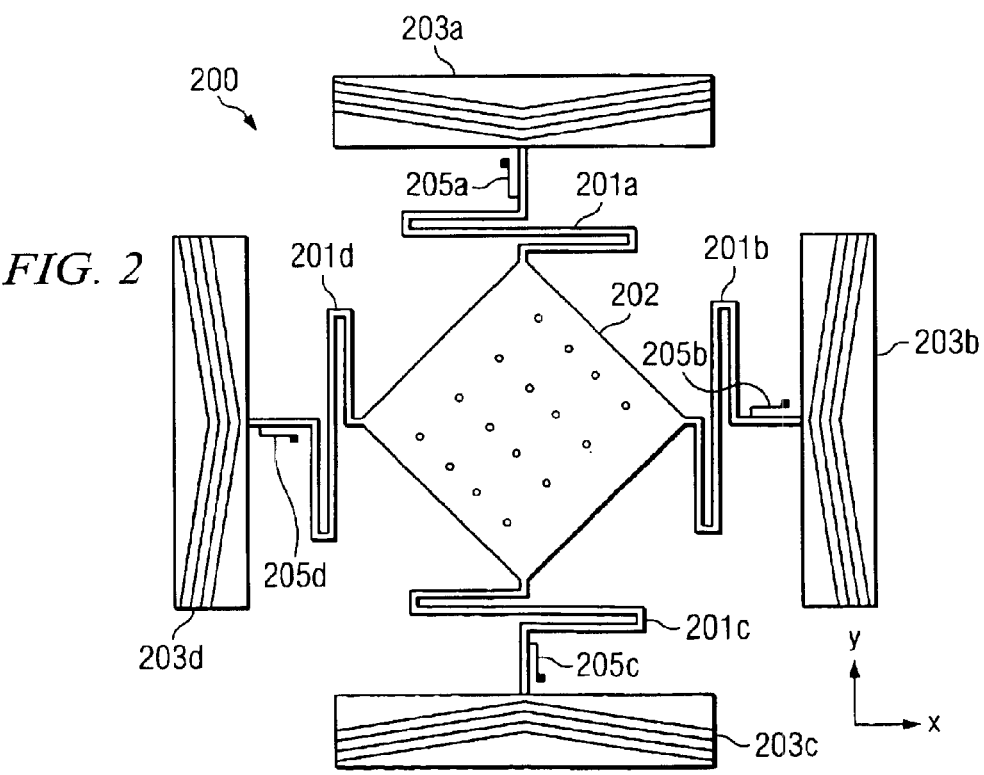
FIG. 2 depicts an XY stage according to embodiments of the present invention.
Figure 1B:
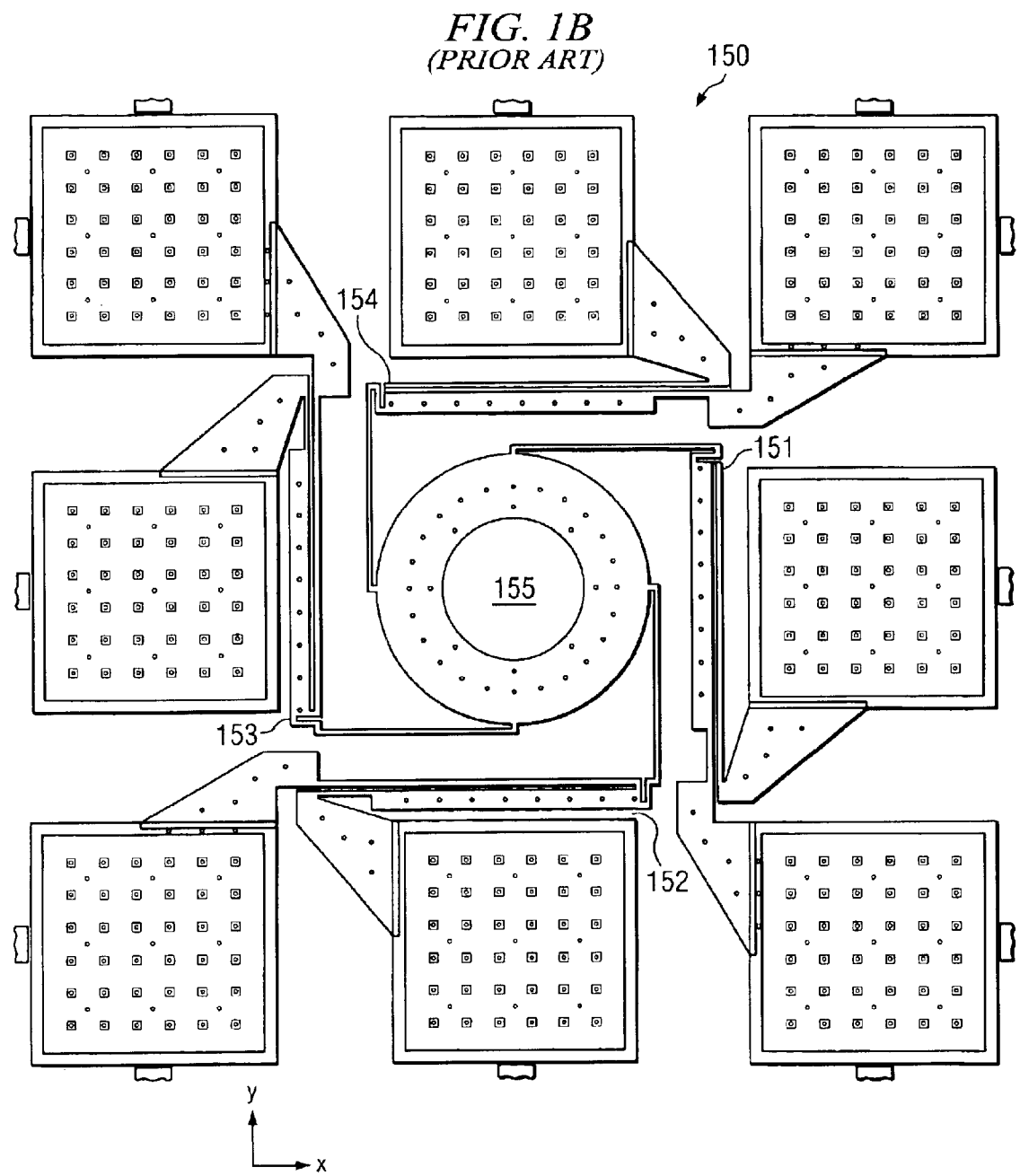
FIG. 1B is a cascaded XY stage that manipulates a micro-lens according to the prior art.

FIG. 2 depicts system 200 that manipulates XY stage 202 according to embodiments of the present invention. System 200 comprises a plurality of flexures (201a, 201b, 201c, and 201d) that are mechanically coupled to XY stage 202. Flexures 201a, 201b, 201c, and 201d are structural elements that are relatively flexible in one direction and are relatively stiff in the other direction. Flexures 201a–201d may comprise a plurality of "bends" which provide the desired flexibility and stiffness in orthogonal directions. For example, as shown in FIG. 2, flexure 201a is relatively flexible in the Y-direction. Application of a force in the Y-direction on flexure 201a will tend to deform the elements of flexure 201a, i.e., flexure 201a either expands or compresses. However, flexure 201a is relatively stiff in the X-direction. Accordingly, application of a force in the X-direction tends to displace flexure 201a instead of deforming the elements of flexure 201a. It shall be appreciated that the design of flexures 201a–201d as shown in FIG. 2 is merely exemplary and other flexure designs may be utilized according to embodiments of the present invention.

Flexures 201a, 201b, 201c, and 201d are mechanically coupled to actuators 203a, 203b, 203c, and 203d which may be implemented as, for example, stacked sets of thermal elements. When current is applied to actuators 203a–203d, the thermal elements experience Ohmic heating. The heating causes differential displacement of the thermal elements causing actuation in the desired direction. In embodiments of the present invention flexures 201a, 201b, 201c, and 201d may be associated with anchor elements 205a–205d. Anchor elements 205a–205d may amplify the displacement associated with actuators 203a–203d as will be discussed in greater detail with respect to FIG. 10. Also, it shall be appreciated that, when actuators are coupled with anchor elements 205a–205d, actuators 203a–203d are not purely linear devices. For example, application of current to actuator 203a will cause actuation primarily in the X-direction and, to a lesser degree, will cause actuation in the Y-direction. Other suitable actuators may also be utilized such as electrostatic actuators.

Actuators 203a–203d and flexures 201a–201d are disposed in and operate in a "mirrored" fashion to compensate for the non-linear characteristics of actuators 203a–203d coupled with anchor elements 205a–205d. Specifically, in system 200, actuators 203a, 203c and flexures 201a, 201c enable displacement of XY stage 202 in the X-direction. When it is desired to displace XY stage 202 in the X-direction, current is supplied to both of actuators 203a and 203c. Because flexures 201a and 201c are relatively stiff with respect to the X-direction, the displacement generated by actuators 203a and 203c causes a force to be transmitted to XY stage 202 via flexures 201a and 201c. Also, it shall be appreciated that application of current causes actuators 203a and 203c coupled with anchor elements 205a and 205c to generate forces in the Y-direction. However, the force generated by actuator 203a in the Y-direction is balanced by the force generated by actuators 203c in the Y-direction. The total torque applied to XY stage 202 is zero due to the mirrored configuration and operation. Similarly, actuators 203b and 203d and flexures 201b and 201d are disposed in and operate in a mirrored manner as actuators 203a–203d and flexures 201a–201d. Accordingly, actuation in both of the X-direction and Y-direction is fully decoupled.

Positioning of XY stages according to known systems are problematic when open-loop controls are utilized, because the position of an XY stage may change in a non-deterministic manner due to thermal drift and other physical phenomenon. In embodiments of the present invention, XY stage system 200 may be mechanically coupled to a base structure which provides closed-loop feedback. By providing closed-loop feedback, embodiments of the present invention enable XY stage 202 to be repeatedly positioned at a specified location. This type of functionality may be advantageous for numerous applications such as scanning electron microscopes, tunneling electron microscopes, atomic force microscopes, and nano or micro fabrication process systems.

FIG. 3 depicts structure 300 that includes a plurality of capacitive elements (301, 302, 303, and 304) to implement quadrant capacitive feedback. In embodiments of the present invention, capacitive elements 301–304 may be fabricated on a base structure to which system 200 may be mechanically coupled to collectively form structure 300. When XY stage 202 is translated, the amount of overlap between XY stage 202 and the respective capacitive elements 301 through 304 changes. Because the capacitance associated with a respective capacitive element and XY stage 202 is related to the amount of overlap, measuring the capacitance associated with each of capacitive elements 301 through 304 in response to an applied alternating circuit signal permits the XY position of XY stage 202 to be determined. Furthermore, the Z position of XY stage 202 relative to base structure 300 may be determined by summing the capacitance associated with capacitive elements 301 through 304.

In alternative embodiments, a differential capacitive arrangement may be utilized to provide positioning feedback. System 400 of FIG. 4 comprises a plurality of interdigitated capacitive electrode sets (401, 402, 403, 404) which are mechanically coupled to stage 202. A corresponding base structure (not shown) may comprise corresponding interdigitated capacitive electrode sets. In the detection of small capacitances, signal noise is often the limiting factor in obtaining a high resolution measurement. Differential measurement techniques are often utilized to eliminate "common mode" noise (i.e., the noise that is common to two inputs). In embodiments of the present invention, the capacitive electrode sets are placed such that one set of interdigitated capacitors is increasing while the other set is decreasing, so that one signal may be subtracted from the other (the common mode noise cancels out) to obtain the capacitance measurement.

In embodiments of the present invention, XY stages may be fabricated as fully released structures utilizing surface micro-machining techniques such as the Multi-User Micro-Electro-Mechanical process (MUMPs process). FIG. 5 depicts exemplary fabrication stage 500 according to embodiments of the present invention. Fabrication stage 500 comprises XY stage system 501 fabricated on sacrificial layer 502 of silicon dioxide that is deposited on silicon substrate 503. XY stage 501 may be designed to be mechanically coupled to a suitable base structure such as base structure 600 of FIG. 6A via receptacles 504. Base structure 600 may comprise corresponding coupling elements 601 to mechanically couple to XY stage system 501.

Coupling elements 601 may be implemented as "snap connectors" as disclosed in co-pending and commonly assigned U.S. patent application Ser. No. 09/570,170 entitled "System and Method for Coupling Micro-Components," which is incorporated herein by reference. An example of snap connector 650 is provided in FIG. 6B. The snap connector may comprise opposing latching arms that apply a spring force when deflected. The latching arms may be preloaded by bringing the opposing latching arms closer together. The latching arms may remain in the preloaded position by utilizing a suitable cocking mechanism. The latching arms may be inserted into a suitable corresponding receptacle. The snap connector may further comprise a triggering mechanism. When the triggering mechanism is contacted during insertion of the snap connector into the receptacle, the latching arms are released from the preloaded state and return to their equilibrium position. Moreover, the latching arms may comprise suitable barbs to retain the latching arms in the receptacle thereby facilitating the desired mechanical coupling. Although snap connectors are advantageous for assembly operations, it shall be appreciated that embodiments of the present invention are not limited to snap connections. Any other suitable coupling mechanism may be utilized such as metallic bonding elements.

Base structure 600 may comprise a plurality of power pads 602 to provide current to actuators of XY stage system 501 and any other suitable electrical elements (not shown). Also, base structure 600 may comprise electrostatic element 603. Electrostatic element 603 may be utilized to apply an electrostatic force to the XY stage 202 of XY stage system 501 to actuate XY stage 202 in the Z-direction. As previously noted, base structure 600 may comprise feedback elements 604.

Figure 7:
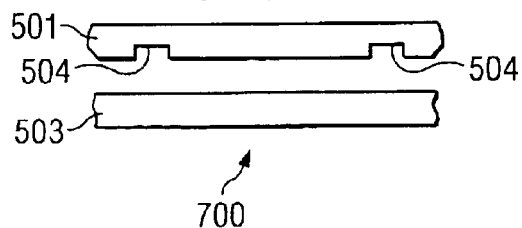
FIG. 7 depicts a base structure mechanically coupled to an XY stage according to embodiments of the present invention.
Figure 8A:
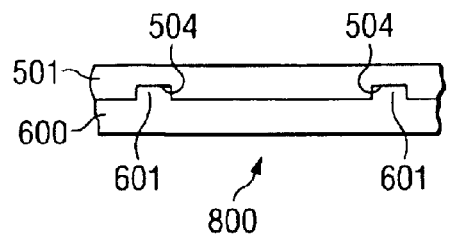
FIG. 8A depicts an XY stage mechanically coupled to a base structure and released from a silicon substrate according to embodiments of the present invention.

During fabrication, a suitable etching solution may be applied to fabrication stage 500 to remove sacrificial layer 502. FIG. 7 depicts fabrication stage 700 which comprises XY stage system 501 released from substrate 503 after application of the suitable etching solution. FIG. 8A depicts XY stage system 501 mechanically coupled to base structure 600 via the snap connectors and receptacles of XY stage system 501 and base structure 600. Together XY stage system 501 and base structure 600 provide a fully released XYZ stage that provides decoupled actuation and closed loop feedback.

Figure 8B:
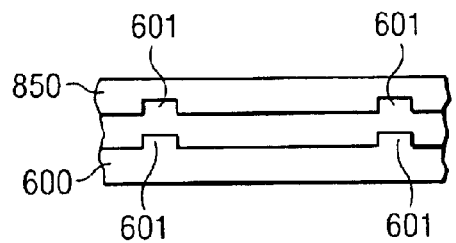
FIG. 8B depicts a payload structure mechanically coupled to the XY stage and base structure shown in FIG. 8A.

It shall be appreciated that payload 850 or other structure may be assembled on to XY stage system 501 in a similar manner as shown in FIG. 8B. Specifically, suitable snap connectors 601 or other connectors may be utilized to mechanically coupled payload 850 to XY stage system 501. For example, a complex assembly may be assembled according to embodiments of the present invention to comprise a stage assembled onto a capacitive detection substrate and a suitable device (e.g., lens, mirror, another XY stage) assembled onto the stage surface.

Figure 9:
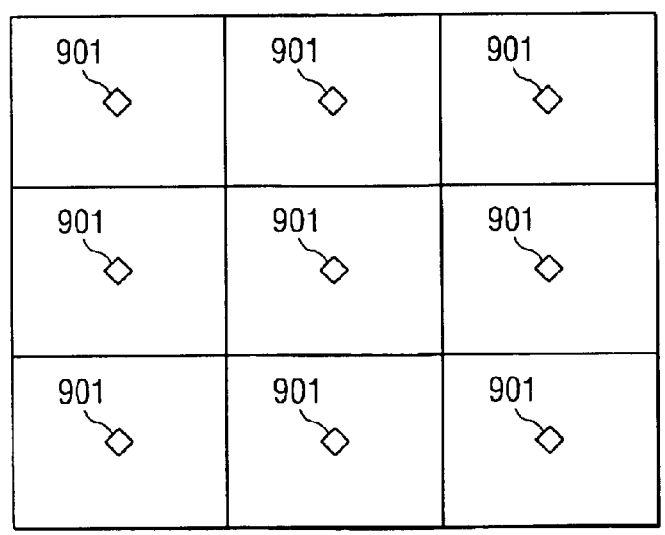
FIG. 9 depicts an array of XYZ stages according to embodiments of the present invention.

Embodiments of the present invention may provide numerous advantages. Specifically, known structures that manipulate high resolution XYZ stages either (1) are associated with coupled movement where actuation in one direction causes a lesser degree of actuation in another direction; (2) require bulky piezo elements to achieve the desired non-coupled movement; or (3) are permanently anchored to the substrate on which they were fabricated. Embodiments of the present invention may dispose and operate thermal or electrostatic actuators in a mirrored manner to cause the actuation to be substantially decoupled. Moreover, the use of thermal or electrostatic actuators enables the size of the device to be greatly reduced. By reducing the size of the individual devices, embodiments of the present invention enable applications to be implemented that employ an array of XYZ stages according to embodiments of the present invention. FIG. 9 depicts exemplary array 900 that includes a plurality of XYZ stages with each of the stages comprising suitable probe or manipulator 901 (e.g., a scanning tunneling tip, a gripper, and/or the like). The array of XYZ stages may be utilized to implement parallel nano or micro fabrication, parallel scanning of a surface, and/or any number of parallel processing applications.

Figure 10:
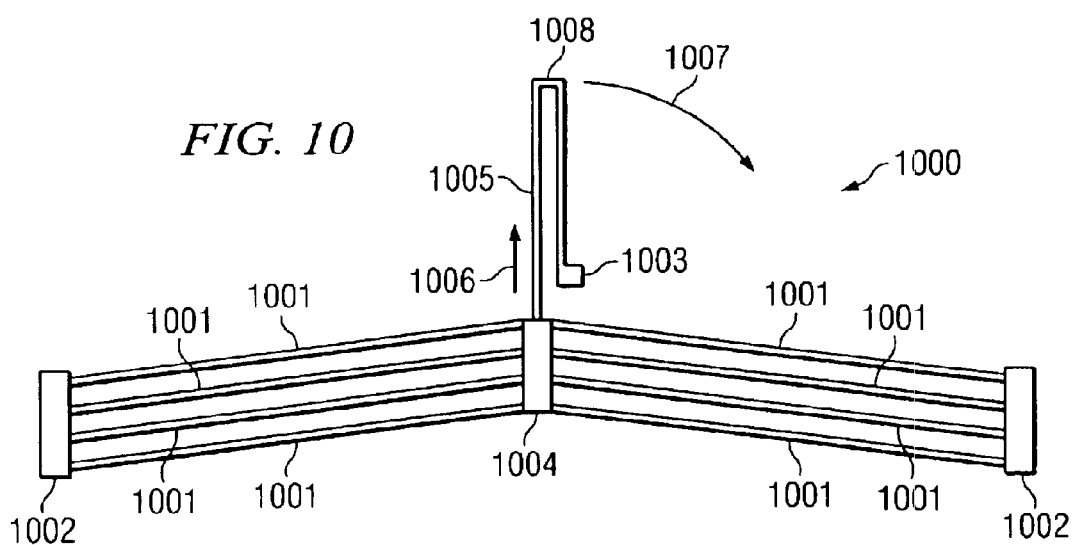
FIGS. 10–19 depicts actuators that exhibit motion amplification utilizing anchored flexures according to embodiments of the present invention.

FIG. 10 depicts flexure amplified thermal actuator 1000 according to embodiments of the present invention. Actuator 1000 comprises a set of bent beams for actuation as is known in the art. An example of a bent beam actuator according to the prior art is described in U.S. Pat. No. 5,909,078. The bent beam portion of actuator 1001 comprises thermal elements 1001, anchors 1002, and joining element 1004. One set of thermal elements is disposed on the "left" side of actuator 1000 and another set is disposed on the "right" side of actuator 1000. The two sets of thermal elements are joined in the middle by element 1004. Moreover, thermal elements 1001 are anchored at their distal ends by anchors 1002. Flexure 1005 is mechanically coupled to element 1004. When current is applied to thermal elements 1001, thermal elements 1001 experience Ohmic heating and tend to expand. Due to anchors 1002 and element 1004, the expansion of thermal elements 1001 causes actuation in direction 1006. Specifically, the actuation is applied to flexure 1005 and is associated with a relatively high force and low displacement.

Actuator 1000 differs from known bent beam designs by anchoring flexure 1005 via anchor 1003. This arrangement causes motion-amplification. Specifically, the actuation applied by thermal elements 1001 via element 1004 causes flexure 1005 to deform due to anchor 1003. Thus, apex 1008 of flexure 1005 experiences a greater amount of displacement than is associated with element 1004. Specifically actuator 1001 provides a greater amount of displacement as a function of device footprint as compared to known bent beam actuators. Curve 1007 shows the range of motion associated with displacement of apex 1008 during operation of actuator 1000. Embodiments of the present invention may adapt actuator 1000 for use in a decoupled MEMs XY or XYZ stage by positioning corresponding actuators 1000 to compensate for the non-linear motion.

Figure 11:
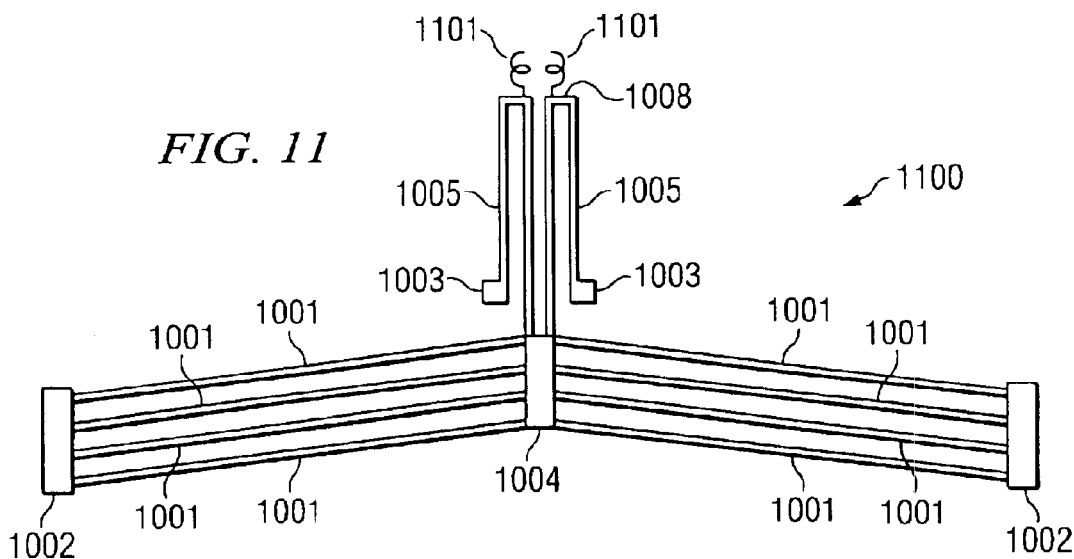

It shall be appreciated that actuator 1000 is not limited to use in XY or XYZ stages. Actuator 1000 may be utilized in any suitable application that may benefit from motion-amplified actuation. For example, FIG. 11 depicts gripper 1100. Gripper 1100 is substantially similar to actuator 1000. Also, gripper 1100 comprises two flexures 1005 and two anchors 1003. A gripping element 1101 is disposed at the end of both flexures 1005. When gripper 1100 is operated (e.g., current is applied), flexures 1005 displace and gripping elements 1101 separate. After current is no longer applied, flexures 1005 return to the original positions and gripping elements 1101 are brought closer together. Accordingly, a structure or device placed in between gripping elements 1101 may then be suitably manipulated. Of course, it shall be appreciated that this embodiment is merely exemplary. Any other suitable application may be implemented utilizing a motion-amplified actuator according to embodiments of the present invention.

Figure 12:
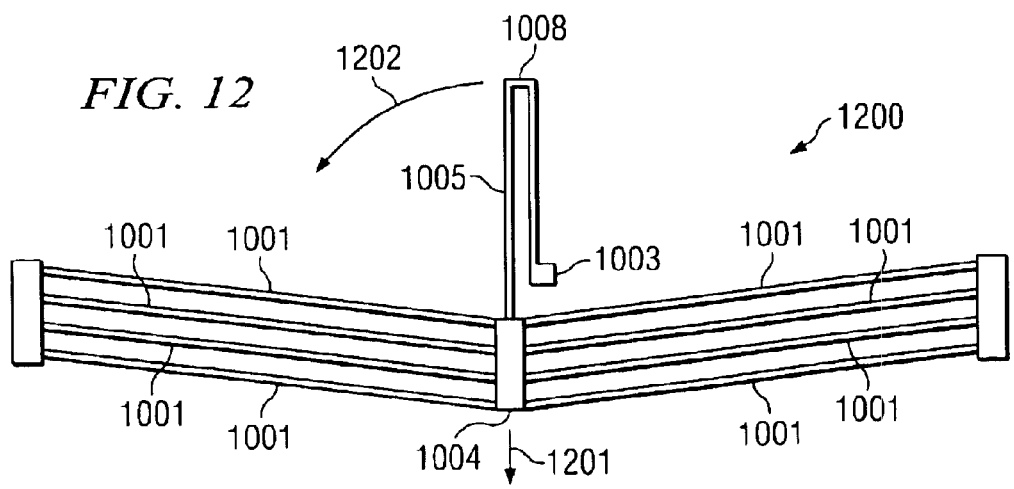
Figure 13:
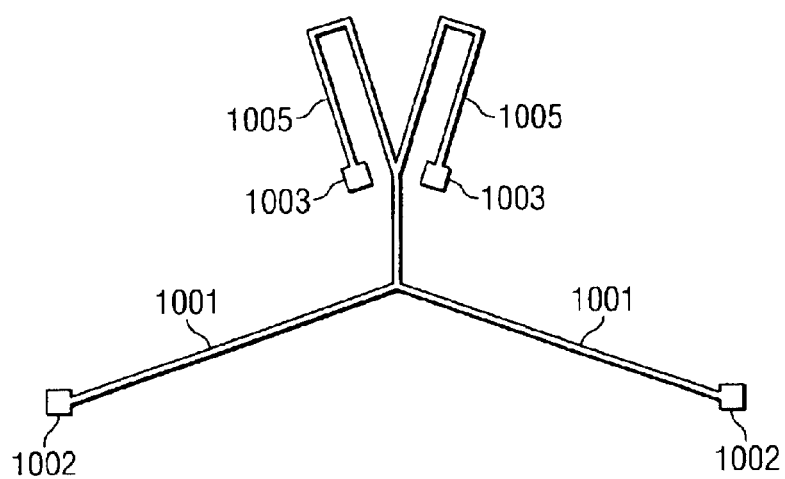
Figure 14:
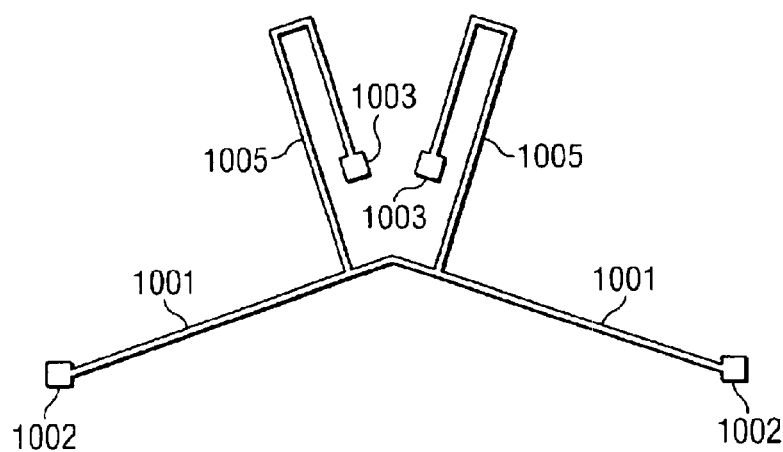
Figure 15:
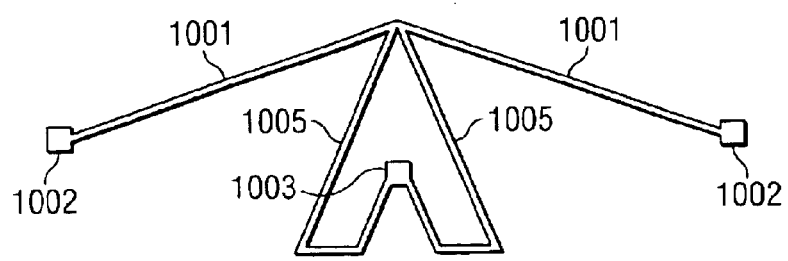
Figure 16:
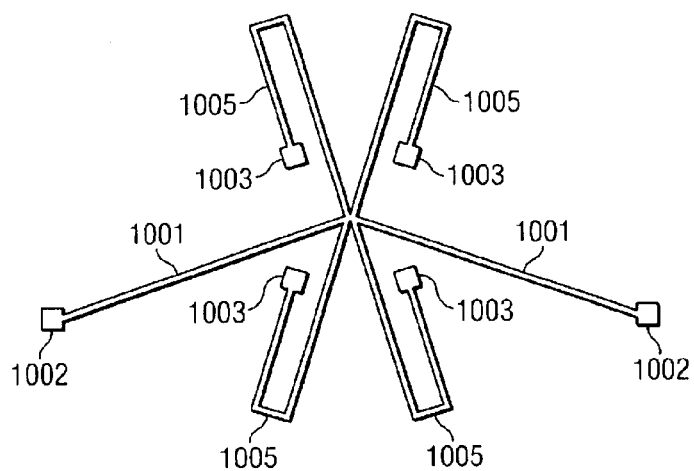
Figure 17:
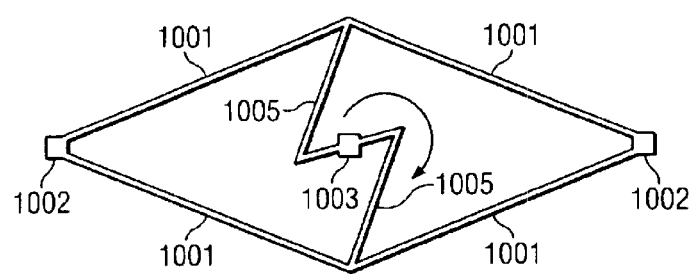
Figure 18:
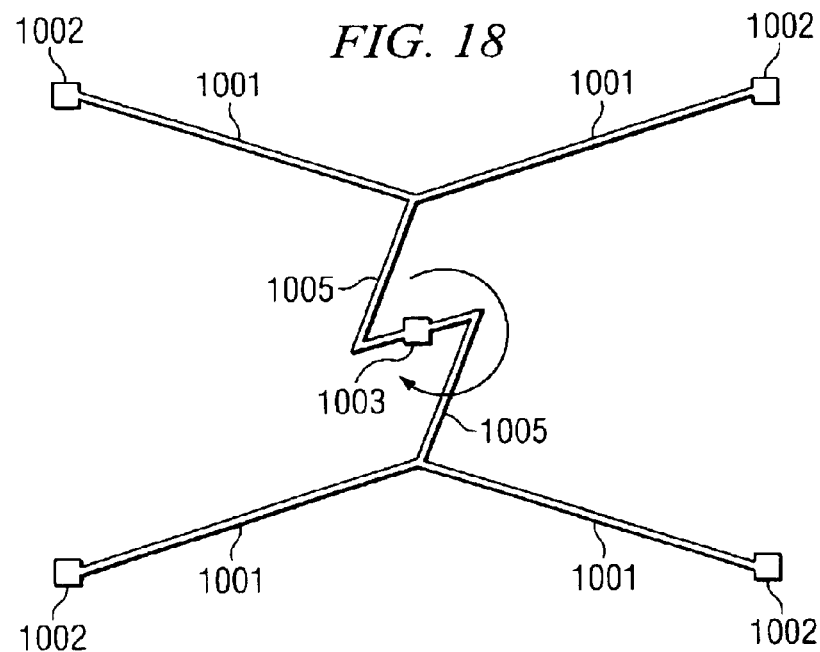
Figure 19:
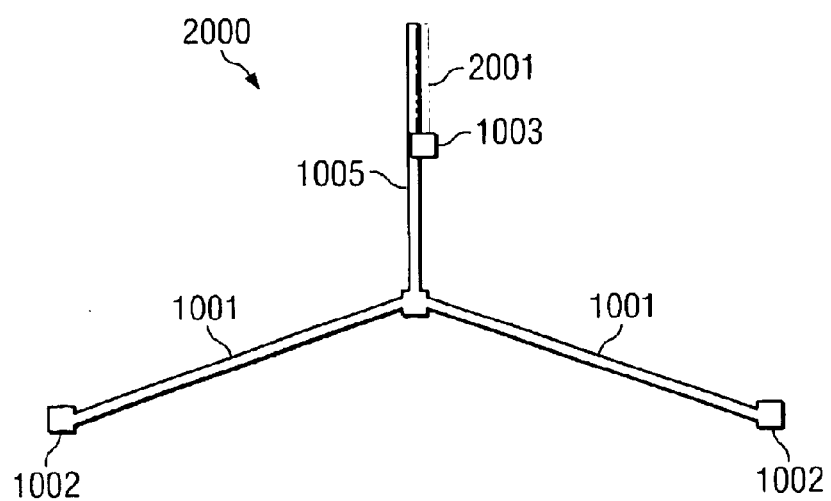

Moreover, it shall be appreciated that embodiments of the present invention are not limited to the configuration of actuator 1000. FIG. 12 depicts an alternative configuration of actuator 1200 according to embodiments of the present invention. Actuator 1200 is substantially similar to actuator 1000. However, actuator 1200 is disposed so that element 1004 is displaced in the opposite direction (direction 1201) as compared to the displacement of element 1004 in actuator 1000. As shown in FIG. 12, this causes the range of motion of apex 1008 of flexure 1005 to follow curve 1202. FIGS. 13–29 depict other configurations that employ a motion-amplified bent beam actuator according to embodiments of the present invention. FIGS. 13–19 illustrate that the angles, lengths, spacings, and numbers of bent beams and/or flexures may be varied for motion-amplified bent beam actuators depending upon the desired application. In particular, FIGS. 17 and 18 depict motion amplified actuators which produce rotational displacement utilizing flexures 1005 and anchor 1003 according to embodiments of the present invention. Additionally, FIG. 19 depicts an out-of-plane design. Specifically, flexures 1005 extend away from bent beams 1002 in the same plane as bent beams 1002. However, flexure portion 1003 is raised and anchored above flexure 1005. Thus, out-of-plane amplified motion may be achieved according to embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for controllably positioning a fully-released micro-stage, comprising:
    a first plurality of actuator means for translating said fully-released micro-stage in a first direction, wherein each of said first plurality of actuator means are mechanically coupled to said fully-released micro-stage by a respective anchored flexure and are complementarily positioned to substantially balance torque applied to said fully-released micro-stage during actuation of said first plurality of actuator means; and
    a second plurality of actuator means for translating said fully-released micro-stage in a second direction, wherein each of said second plurality of actuator means are mechanically coupled to said fully-released micro-stage by a respective anchored flexure and are complementarily positioned to substantially balance torque applied to said fully-released micro-stage during actuation of said second plurality of actuator means, and wherein said first plurality of actuator means and said second plurality of actuator means are controllable with at least sub-micron precision.

2. The system of claim 1 further comprising:
    a third actuator means for translating said fully-released micro-stage in a third direction.

3. The system of claim 2 wherein said third actuator means applies an electrostatic force to actuate said fully-released micro-stage in said third direction.

4. The system of claim 1 wherein said first plurality of actuator means and said second plurality of actuator means are selected from the list consisting of comb drives, parallel plate actuators, shaped memory alloy (SMA) actuators, electrothermal actuators, and piezo stack actuators.

5. The system of claim 1 wherein said first and second plurality of actuator means are stacked sets of bent beams.

6. The system of claim 1 wherein each respective flexure is relatively stiff in a first direction and relatively flexible in a second direction.

7. The system of claim 1 further comprising:
  at least one means for generating a positioning feedback that is indicative of a current position of said fully-released micro-stage.

8. The system of claim 7 wherein said at least one means for generating positioning feedback includes a plurality of capacitive elements.

9. The system of claim 8 wherein said plurality of capacitive elements are disposed in quadrants.

10. The system of claim 8 wherein said plurality of capacitive elements are disposed in pairs to provide differential feedback signals.

11. The system of claim 7 wherein said first and second plurality of actuator means and said fully-released XY stage are integrated on a fully released structure and said fully released structure is mechanically coupled to a support structure.

12. The system of claim 11 wherein said fully released structure is mechanically coupled to said support structure by a snap connector and a corresponding receptacle.

13. The system of claim 11 wherein a structure is mechanically coupled to said XY stage by a snap connector and a corresponding receptacle.

14. The system of claim 13 wherein said structure is selected from the list consisting of: a lens, a mirror, a grating, a probe, and a gripper.

15. A system for controllably positioning a fully-released micro-stage, comprising:
  a first plurality of thermal actuators that are operable to translate said fully-released micro-stage in a first direction;
  a second plurality of thermal actuators that are operable to translate said fully-released micro-stage in a second direction;
  wherein each of said first and second plurality of thermal actuators are mechanically coupled to said fully-released micro-stage by a respective anchored flexure and are complementarily positioned to substantially balance torque applied to said fully-released micro-stage during actuation;
  a third actuator that is operable to translate said fully-released micro-stage in a third direction; and
  at least one positioning feedback element that is operable to provide a signal that is indicative of a current position of said fully-released micro-stage.

16. The system of claim 15 wherein said first and second plurality of thermal actuators are stacks of bent beams.

17. The system of claim 15 wherein each respective flexure is relatively stiff in a first direction and relatively flexible in a second direction.

18. The system of claim 15 wherein said third actuator applies an electrostatic force to actuate said fully-released micro-stage.

19. The system of 15 wherein said at least one positioning feedback element includes a plurality of capacitive elements.

20. The system of claim 19 wherein said plurality of capacitive elements are disposed in quadrants.

21. The system of claim 19 wherein said plurality of capacitive elements are disposed in pairs to provide differential feedback between each of said pairs.

22. The system of claim 15 wherein said first and second plurality of thermal actuators and said fully-released XY stage are integrated on a fully released structure and said fully released structure is mechanically coupled to a support structure.

23. The system of claim 22 wherein said fully released structure is mechanically coupled to said support structure by a snap connector and a corresponding receptacle.

24. The system of claim 23 wherein a structure is mechanically coupled to said XY stage by a snap connector and a corresponding receptacle.

25. The system of claim 24 wherein said structure is selected from the list consisting of: a lens, a mirror, a grating, a probe, and a gripper.

* * * * *